G. A. MOORE.
CAPSTAN SCREW.
APPLICATION FILED JULY 11, 1917.

1,297,222.

Patented Mar. 11, 1919.

Old Form

Inventor,
George A. Moore;
By
A. B. Upham,
Attorney.

UNITED STATES PATENT OFFICE.

GEORGE A. MOORE, OF MEDFORD, MASSACHUSETTS.

CAPSTAN-SCREW.

1,297,222.     Specification of Letters Patent.     Patented Mar. 11, 1919.

Application filed July 11, 1917. Serial No. 179,889.

*To all whom it may concern:*

Be it known that I, GEORGE A. MOORE, a citizen of the United States, and a resident of Medford, in the county of Middlesex and Commonwealth of Massachusetts, have invented certain new and useful Improvements in Capstan-Screws, of which the following is a specification.

In a patent issued to me August 30, 1910, and numbered 968,783, I disclosed a capstan screw wherein close beneath the head thereof were formed four radial wings having holes formed in their intersections for the introduction of an operating pin. These screws were made of brass, but, owing to the present high price of the metal, I have been endeavoring to make them of steel.

This, for a long time, proved impracticable, every attempt at punching the holes leaving them rough and with a bur on their edges; and when I tried to drill the holes, the drills would, for some unknown reason, snap and break.

After much consideration, I finally discovered that the breaking of the drills was due to the fact that the ninety degree angle between the wings was sharper than the angle of the drill point so that the shoulder of the drill met the wings before its point and hence could not be made to enter them more than to catch and snap the drill.

Following this discovery, I conceived the idea of so flattening the wing angle as to render it equal to or less than that of the drill-points, since the latter could not be made more pointed without injury. Thus to flatten the wing-angle, I reduced the number of wings from its former number, four, to three, and thereby solved the problem, the 120° angle permitting the ready drilling, and enabling the production of a screw cheaper than brass and equally perfect.

In drilling the wings, I employ a machine in which three drills are positioned at relative angles of 120°, centering at a common point, to drill the three holes in the wings of a capstan screw almost simultaneously, one retreating just before the next one advances.

Figure 2:
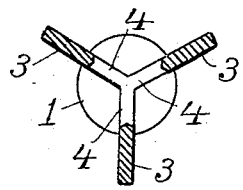
Figure 1:
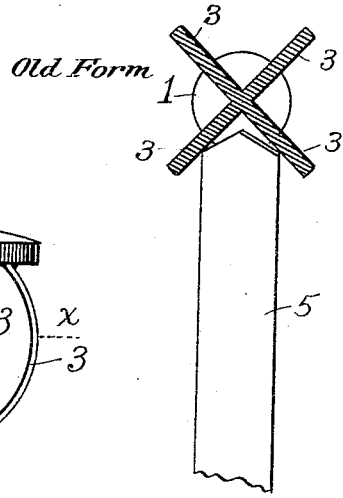
Figure 4:
Figure 3:
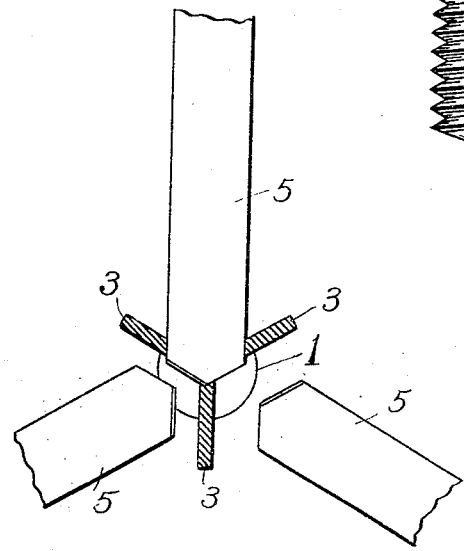

Referring to the drawings forming part of this specification, Figure 1 is an elevation of a capstan screw made in accordance with my invention, but magnified several times. Fig. 2 is a cross section on the dotted line X—X in Fig. 1. Fig. 3 is a like cross section but showing the drills in operative positions. Fig. 4 is a similar section of a four-winged capstan screw showing a drill attempting to enter it.

In the drawings, the reference numeral 1 designates the threaded portion of the capstan screw; 2, the head thereof, and 3 the wings uniting the screw and head and projecting radially from the axis of the screw and head.

Centrally of the intersection of the wings is formed a hole 4 for the introduction of the pin or other tool for forcibly turning the screw. As shown in Fig. 4, the shoulders of a drill, as 5, meet the surfaces of the wings before its point and thereby prevent the holes from being drilled when the capstan screw is composed of steel, and four wings are had as in my former construction.

But, by making the wings three in number, as shown in Fig. 2, the wing-angle is so flattened as to permit the drills to freely penetrate the steel.

As shown in Fig. 3, three drills 5 are preferably used in making the holes 4, working almost simultaneously, but one after the other until the three perfectly formed holes are completed, the last drill performing hardly more than the work of a reamer, but after they have each acted upon the capstan screw, the wings are left as illustrated in Figs. 1 and 2.

Thus formed, not only can the capstan screws be made of steel and hence manufactured at a greatly reduced cost over the brass ones, but they contain other advantages independently of expense. One is that less of the material composing each wing is removed in forming the holes 4 when there are three wings, in comparison with the four holes. This is shown in Figs. 2 and 4, where the latter illustrates that the drill 5 presents its shoulders to the wings at points more than half a radial distance from the center, while Fig. 2 shows that the holes in the three-winged construction reach quite a little less than half way out from the center. Consequently the holes in the four-winged structure remove therefrom much more material than they do from the three-winged screw, and correspondingly weaken the former construction.

Further, the three-winged arrangement permits a six-fold variation in position on the part of the pin or other tool used for turning the capstan screw, whereas the four-winged one allows but four positions. In the three-winged screw, the actuating pin can be introduced through the hole between two adjacent wings and thence at either side of the wing opposite thereto, thus providing two different angular positions between each pair of wings, or six altogether. With the four-winged screw, the actuating pin cannot be sufficiently slender for entering the holes otherwise than radially, without unduly weakening it for the actuating pressure required for forcibly turning the capstan screws; thus limiting it to the four ninety-degree positions.

What I claim is:

A steel capstan screw comprising a threaded portion, a head, and three radially disposed wings joining the head and threaded portion, the wings making angles of approximately 120° with respect to each other, and holes being formed through the wings at their intersections, said angles permitting said holes to be drilled by means of drills ground for efficient work in steel.

In testimony that I claim the foregoing invention I have hereunto set my hand this 9th day of July, 1917.

GEORGE A. MOORE.

Copies of this patent may be obtained for five cents each, by addressing the "Commissioner of Patents, Washington, D. C."